United States Patent
Kimber et al.

(10) Patent No.: US 10,019,420 B2
(45) Date of Patent: Jul. 10, 2018

(54) SYSTEM AND METHOD FOR ADDING FUNCTIONALITY TO WEB-BASED APPLICATIONS HAVING NO EXTENSIBILITY FEATURES

(71) Applicant: THINK RESEARCH CORPORATION, Toronto (CA)

(72) Inventors: Ryan Kimber, Toronto (CA); Saurabh Mukhi, Toronto (CA); Alfred Wong, Toronto (CA)

(73) Assignee: Think Research Corporation, Toronto, Ontario (CA)

( * ) Notice: Subject to any disclaimer, the term of this patent is extended or adjusted under 35 U.S.C. 154(b) by 238 days.

(21) Appl. No.: 14/872,870

(22) Filed: Oct. 1, 2015

(65) Prior Publication Data

US 2017/0097740 A1    Apr. 6, 2017

(51) Int. Cl.
| | |
|---|---|
| G06F 15/00 | (2006.01) |
| G06F 13/00 | (2006.01) |
| G06F 17/22 | (2006.01) |
| H04L 29/08 | (2006.01) |
| H04L 29/06 | (2006.01) |

(52) U.S. Cl.
CPC .......... *G06F 17/2247* (2013.01); *H04L 67/02* (2013.01); *H04L 67/10* (2013.01); *H04L 67/42* (2013.01)

(58) Field of Classification Search
CPC ............... G06F 2209/545; H04L 67/10
USPC .......... 715/234, 763–765, 851–853
See application file for complete search history.

(56) References Cited

U.S. PATENT DOCUMENTS

| | | |
|---|---|---|
| 6,665,658 B1 | 12/2003 | Dacosta et al. |
| 7,085,736 B2 | 8/2006 | Keezer et al. |
| 7,533,144 B2 | 5/2009 | Kassab |
| 7,742,953 B2 | 6/2010 | King et al. |
| 7,899,808 B2 | 3/2011 | Fisher et al. |
| 8,214,486 B2 | 7/2012 | Britton et al. |
| 8,234,275 B2 | 7/2012 | Grant et al. |
| 8,355,949 B1 | 1/2013 | Agostino et al. |
| 8,543,571 B2 | 9/2013 | Baessler et al. |
| 9,531,838 B1 * | 12/2016 | Britto ..................... G06F 9/542 |
| 2002/0123334 A1 | 9/2002 | Borger et al. |
| 2004/0073713 A1 | 4/2004 | Pentikainen et al. |
| 2004/0117376 A1 | 6/2004 | Lavin et al. |
| 2005/0004844 A1 | 1/2005 | Attia |

(Continued)

FOREIGN PATENT DOCUMENTS

WO    2013132423    9/2013

*Primary Examiner* — Kevin Nguyen

(57) ABSTRACT

Disclosed are systems and methods of extending user interface web pages of a web-based application with user interface elements of a second web-based application. A client receiving a web page from a first server may detect that web page as including user interface of a first web-based application. The client may analyze that web page to extract data and send that data to a second server. The client may receive an indication of one or more modifications to make to the web page from the second server so as to display user interface of a second web-based application. The web page may be modified according to the indication, and the modified web page rendered in the client browser so as to yield a screen display with user interface elements of both the first and second web-based applications. Embodiments may employ a web browser plug-in.

21 Claims, 4 Drawing Sheets

(56) References Cited

U.S. PATENT DOCUMENTS

| | | |
|---|---|---|
| 2006/0080314 A1 | 4/2006 | Hubert et al. |
| 2007/0027715 A1 | 2/2007 | Gropper et al. |
| 2007/0192872 A1 | 8/2007 | Rhoads et al. |
| 2007/0204223 A1 | 8/2007 | Bartels et al. |
| 2008/0184102 A1 | 7/2008 | Selig |
| 2008/0189626 A1 | 8/2008 | Coutts |
| 2009/0150764 A1* | 6/2009 | Farrell ............... G06F 17/30905 715/234 |
| 2009/0254424 A1 | 10/2009 | Swanson |
| 2010/0083105 A1 | 4/2010 | Channabasavaiah |
| 2010/0138437 A1* | 6/2010 | Nadig ................. G06F 17/3089 707/759 |
| 2011/0145138 A1 | 6/2011 | Bradley |
| 2011/0154212 A1 | 6/2011 | Gharpure et al. |
| 2013/0212469 A1 | 8/2013 | Tian |
| 2015/0261880 A1* | 9/2015 | Luo ......................... H04L 67/10 707/736 |

* cited by examiner

SYSTEM AND METHOD FOR ADDING FUNCTIONALITY TO WEB-BASED APPLICATIONS HAVING NO EXTENSIBILITY FEATURES

TECHNICAL FIELD

This relates to systems and methods for adding functionality to existing software applications, and more particularly to systems and methods for exposing additional functionality and interface of a web-based application that is otherwise not readily extensible.

BACKGROUND

Often, adding new functionality to existing software applications is desirable. For the authors of the applications, adding new features or new functionality is practical, as the functionality can be added to the source code of existing software. In other cases, the task may require more than simply modifying the source code of the application.

For example, a third-party vendor wishing to offer software that adds functionality to an existing application may be unable to do so without access to the source code for the existing application.

Similarly, even where a vendor wants to add to an existing application and has access to the source code, it is possible that the application is extremely complex or written using a legacy programming language. It may be difficult to find personnel to work with the existing source code of such older applications to add functionality due to lack of documentation or inexperience with legacy programming languages.

In some cases, an existing application may be extensible through an application programming interface (API) that allows third-party developers to add features to the software by way of new code that is run inside or otherwise permitted to access the internals of the existing application.

However, in other cases no such extensibility features are provided or the extensibility features may not be such that they permit adding functionality of the desired type.

Web-based applications are accessed by users via a web browser that accesses pages from a server. In some cases, there may be no extensibility features provided in the server software providing such an application. In other cases, the server may be operated under the control of the software vendor such as with, for example, a cloud service, providing no opportunity for added third-party functionality even if extensibility features exist on the server.

In yet other cases users may need or choose to interact with two or more related web-based applications using, for example, the tab or multiple-window features of a web browser to separately access the web pages providing the interface of each of the applications. Data sharing across those applications may not be easy.

SUMMARY

In one aspect, there is provided a computer-implemented method of extending user interface web pages of a first web-based application with user interface elements of a second web-based application, the first application hosted by a first web server and the second application hosted by a second web server, each of the first and second servers in communication with one or more clients, the method comprising: receiving, at the client from the first server, a web page; detecting the web page as a web page comprising user interface of the first application; in response to the detecting: analyzing, at the client, the web page to extract data; sending, from the client to the second server, the data as extracted; receiving, at the client from the second server, an indication of one or more modifications to make to the web page so as to display user interface of the second application; modifying the web page according to the indication; and displaying, at the client, a screen display corresponding to the modified web page, the screen display comprising user interface elements of each of the first web-based application and the second application.

In this way, user interface web pages of a first web-based application that has no or limited extensibility features may be enhanced to include user interface of a second web-based application.

In another aspect, there is provided client computer system, the system comprising: at least one processor; a network adapter in communication with the at least one processor; a display; and, memory in communication with the at least one processor, the memory storing software adapting the client computer system to extend user interface web pages of a first web-based application with user interface elements of a second web-based application, the first application hosted by a first web server and the second application hosted by a second web server, each of the first and second servers in communication with the client computer system, wherein the software when executed by the at least one processor, causes the client computer system to: receive, at the client from the first server, a web page; detect the web page as a web page comprising user interface of the first application; in response to the detecting: analyze, at the client, the web page to extract data; send, from the client to the second server, the data as extracted; receive, at the client from the second server, an indication of one or more modifications to make to the web page so as to display user interface of the second application; modify the web page according to the indication; and display at the client, a screen display corresponding to the modified web page, the screen display comprising user interface elements of each of the first web-based application and the second application.

BRIEF DESCRIPTION OF THE DRAWINGS

Embodiments are described in detail below, with reference to the following drawings.

FIG. 4 depicts a simplified organization of software modules exemplary of an embodiment of a web-based application plug-in;

DETAILED DESCRIPTION

Figure 1:
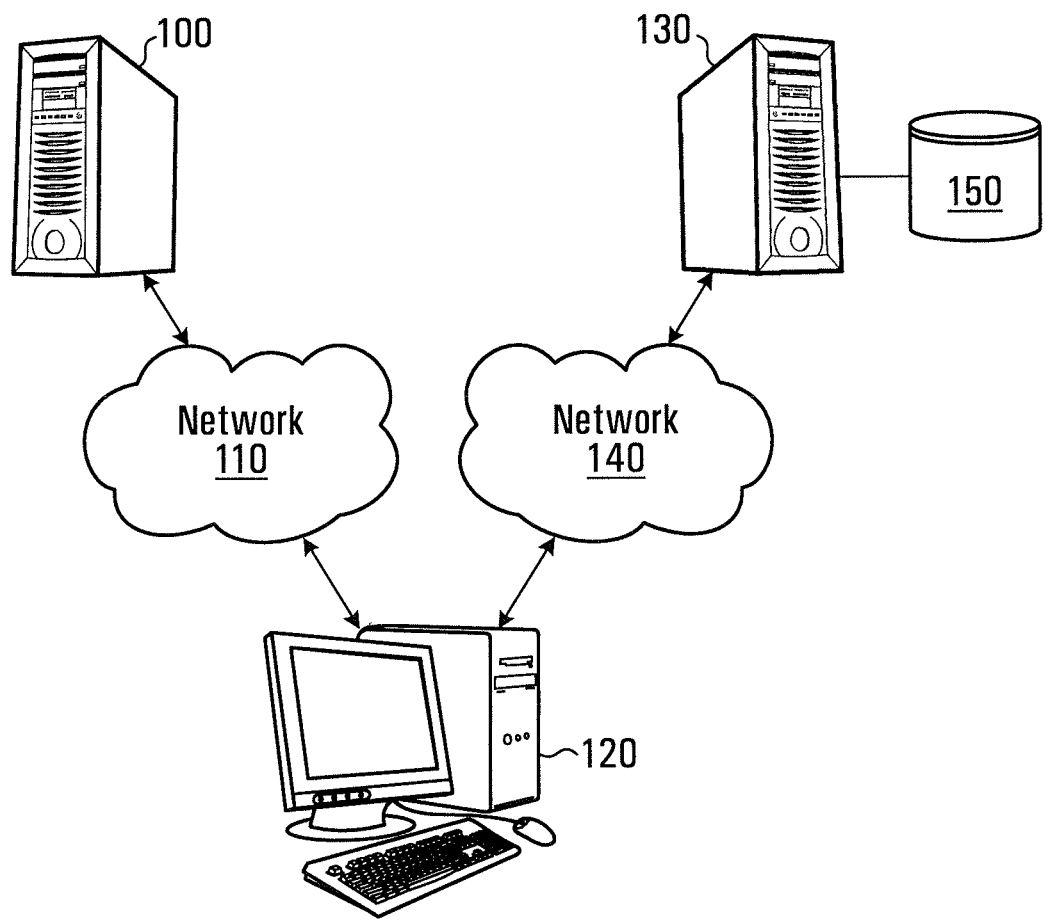
FIG. 1 is a diagram illustrating an operating environment of an example embodiment.

FIG. 1 is a schematic block diagram illustrating an operating environment of an example embodiment.

As illustrated, a web-based application server 100 is in communication with a client device 120 by way of a network 110. Network 110 may, for example, be a LAN, a WAN, the public Internet, a Virtual Private Network (VPN) or the like.

Web-based application server 100 is a server that provides the functionality of a web-based application such as, for example, a line-of-business application, such as an ordering system, or a web-based electronic medical records system.

Client device 120 is a computer, tablet, smart cellular telephone or the like, capable of accessing web pages via a web browser. In particular, client device 120 is configured to permit a user to access, using the web browser, one or more web pages providing the interface of the web-based application of web-based application server 100.

Add-on application server 130 is in communication with client device 120 by way of a network 140. Network 140 may be, for example, a LAN, a WAN, the public Internet, a Virtual Private Network (VPN) or the like. Network 110 and network 140 may be different networks and client device 120 may be in communication with both. Additionally or alternatively, network 140 may be in communication with network 110. For example, web-based application server 100 may be on the same LAN as client device 120, while add-on application server 130 may be a cloud server accessed on the Internet, accessed by client device 120 by way of a gateway on the LAN. Alternatively again, network 140 and network 110 may be the same network. For example, web-based application server 100 and add-on application server 130 may be on the same LAN.

Add-on application server 130 may provide clients with additional functionality of an add-on application that exposes functionality related to web-based application of web-based application server 100 such as, for example, by way of extending the features of the web-based application, exposing new features, or other modification of existing features such as, for example, by improving their ease-of-use.

For example, if the web-based application of web-based application server 100 is a line-of-business system, the add-on application of add-on application server 130 may be a related line-of-business system. For example, the web-based application may be a custom order processing application and the add-on application may be a customer relations management application. In another example, the web-based application may be a web-based electronic medical records system, and the add-on application may be an application for making insurance claims.

Add-on application server 130 is in communication with a database 150. Database 150 is used to store information necessary for providing the functionality of the add-on application of add-on application server 130. Database 150 may be operated on a separate computing device from add-on application server 130.

Add-on application server 130 may be in communication with database 150 by way of a network or similar data communications, such as, for example, a LAN or a SAN, using infrastructure such as, for example, an Ethernet network, Fiber Channel, or the like.

Additionally or alternatively, information stored in database 150 may be stored in an environment remote from that of add-on application server 130 such as, for example, at a remote data center accessible by way of, for example, a LAN or WAN.

As will become apparent, client device 120 has been adapted by way of a web browser plug-in so as to cause client device 120 to selectively communicate with add-on application server 130 to send information from web pages to add-on application server 130 and to receive information therefrom. Information received from add-on application server 130 may be used by client device 120 to for example, augment web pages providing the interface of the web-based application of web-based application server 100 with one or more additional elements. In this way, the functionality of the add-on application of add-on application server 130 may be accessed by a user at client device 120 via the same web pages as provides the interface of the web-based application of web-based application server 100.

Figure 2:
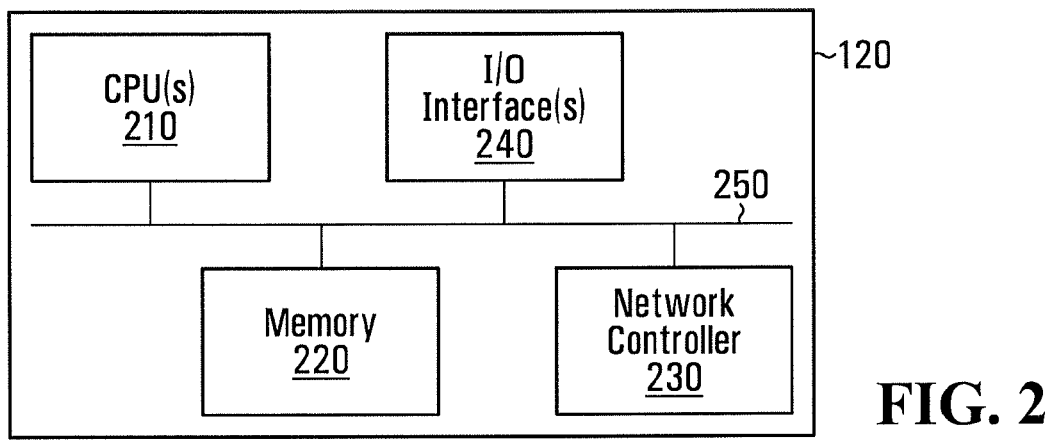
FIG. 2 is a high-level block diagram of a computing device, exemplary of an embodiment.

FIG. 2 is a high-level block diagram of a computing device, exemplary of an embodiment of client device 120. As will become apparent, the computing device includes software that adapts a web-browser to selectively modify one or more of the web pages providing the interface of the web-based application.

As illustrated, client device 120, a computing device, includes one or more processors 210, a memory 220, a network controller 230 and one or more I/O interfaces 240 in communication over a bus 250.

One or more processors 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Optionally, network controller 230 may be accessed via the one or more I/O interfaces.

Software comprising instructions is executed by one or more processors 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Figure 3:
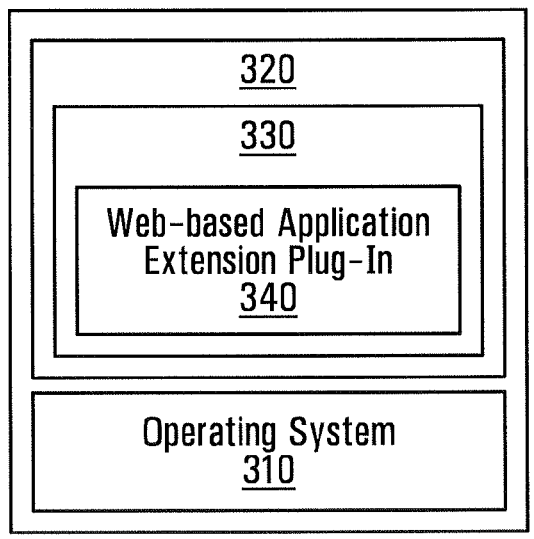
FIG. 3 illustrates the software organization of the computer of FIG. 2.

FIG. 3 depicts a simplified organization of example software components stored within memory 220 of client device 120. As illustrated these software components include operating system (OS) software 310 and a web browser 320.

OS software 310 may be, for example, Microsoft Windows, UNIX, Linux, Mac OSX, or the like. OS software 310 allows web browser 320 to access one or more processors 210, memory 220, network controller 230, and one or more I/O interfaces 240 of client device 120.

Web browser 320 adapts client device 120, in combination with OS software 310, to operate as client for accessing web pages such as the interface pages of the web-based application of web-based application server 100. Web browser 320 may be, for example, Microsoft Internet Explorer, Mozilla Firefox, Apple Safari, Google Chrome, or the like.

Web browser 320 is configured to allow extensions via one or more plug-ins, add-ins, extensions, or similar (collectively "plug-ins"). Plug-ins are software modules that are executed by one or more processors 210 in concert with web browser 320. Plug-ins may execute in a plug-in host environment 330 of web browser 320. Plug-ins executing in plug-in host environment 330 interact with web browser 320 according to a defined application programming interface (API) and/or a defined application binary interface (ABI). For example, plug-ins may interact by following the Internet Explorer browser API, the Netscape Plugin Application Programming Interface (NPAPI), the Apple Safari extensions API, or the like. According to the API or ABI, plug-ins may make procedure or function calls that access services provided by web browser 320 such as, for example, services permitting display and control of user interface, network communication, examination of the contents of webpages accessed by a user using web browser 320, modification of webpages accessed by a user using web browser 320, and the like. Plug-ins may extend the functionality and features of web browser 320. Plug-ins may be provided the same vendor or a different vendor than that of web browser 320.

Plug-ins executing in plug-in host environment 320 may execute in the same OS process as web browser 320 or in another process such as may communicate with the process of web browser 320 using Inter-Process Communication (IPC) facilities as may be provided by OS software 310. Plugin-ins executing in the same OS process as web browser 320 may share threads with the web browser or may execute on dedicated execution threads such as, for example, using a dedicated plug-in thread pool.

As illustrated, a web-based application extension plug-in 340, exemplary of an embodiment, is hosted within plug-in host environment 330. Web-based application extension plug-in 340 adapts web browser 320 to selectively communicate with add-on application server 130 to send information from the web pages at device 120 to add-on application server 130 and to receive information therefrom. Conveniently, web-based extension plug-in 340 may also have access to data provided by or to application server 100.

Figure 4:
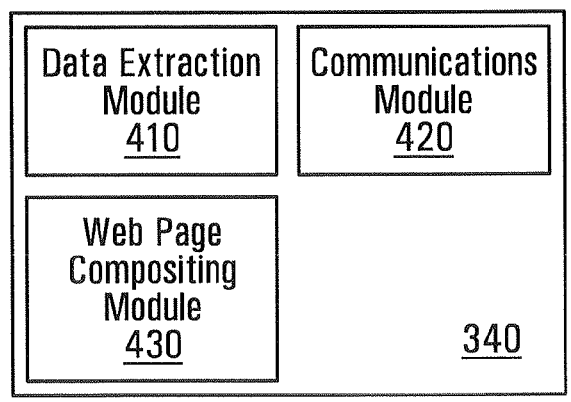

Web-based application plug-in 340 may include one or more software modules. FIG. 4 depicts a simplified organization of software modules exemplary of an embodiment of web-based application plug-in 340. As illustrated, web-based application plug-in 340 includes a data extraction module 410 for extracting data from web pages accessed using web browser 320, a communications module 420 for performing network I/O, and a web page composition module 430 for modifying web pages accessed using web browser 320.

Figure 5:
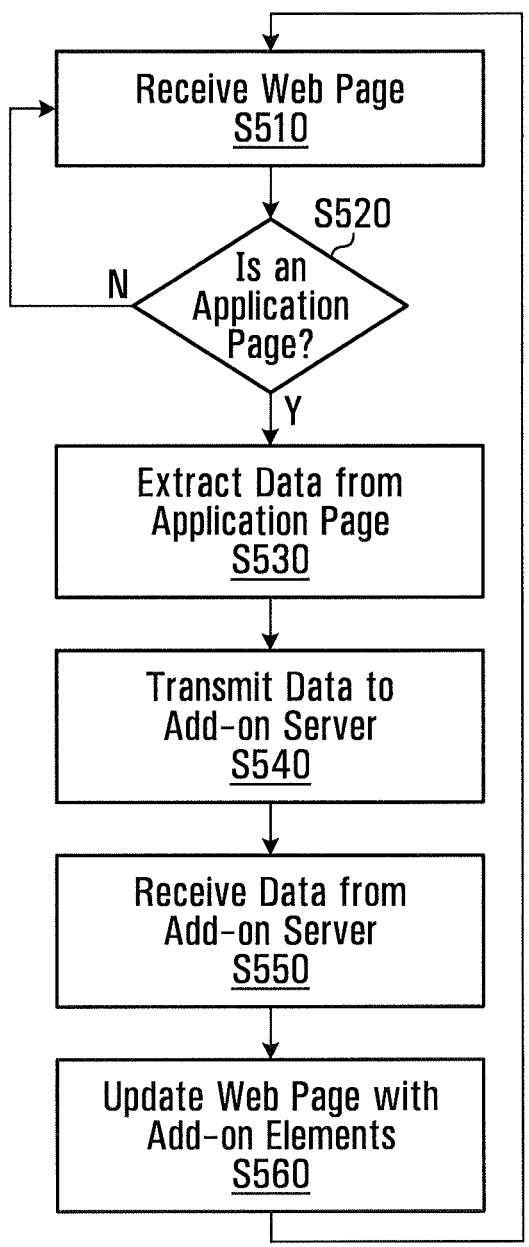
FIG. 5 is a flow chart depicting example blocks performed by the software of FIG. 3.

The operation of web-based application extension plug-in 340 is described with reference to the flowchart of FIG. 5. Blocks S510 and onward are performed by one or more processors 210 executing web-based application extension plug-in 340 at client device 120.

At block S510, one or more processors 210 retrieve a web page from a web server, such as for example, accessed over network 110 or network 140 by way of network controller 230 according to web browser 320. The web-page may be retrieved from server 100. Retrieval of a web page may be triggered such as by, for example, by user input such as, for example, clicking on a hyperlink using a mouse or other peripheral in communication with client device 120 by way of, for example, one or more I/O interfaces 240. Additionally or alternatively, retrieval of a web page may be triggered by software executing at client device 120 such as, for example, according to a web page script as may be executed by one or more processors 210 according to, for example, a JavaScript engine of web browser 320.

At block S520, the retrieved web page is analyzed according to Web-based application extension plug-in 340 to determine whether it is a web page associated with the application of web-based application server 100.

The analysis of the retrieved web page may involve an analysis of a URL associated with the retrieved web page such as to determine whether the page is being accessed from web-based application server 100. Additionally or alternatively, the URL accessed by the web page may be considered either in whole or in-part including, for example, one or more of the protocol, the hostname, either in whole or in part (e.g. domain name, subdomain, top-level domain, or the like), the port, the path, parameters, fragment, and named anchor. For example, the URL associated with the retrieved web page may be analyzed to determine whether it contains particular substrings or matches a form name associated with web pages such as for example, user interface pages of the application of web-based application server 100.

Additionally or alternatively, the contents of the retrieved web page may be analyzed by plug-in 340 to determine whether the webpage is associated with the web-based application of web-based application server 100. For example, the content of the retrieved web page may be analyzed to determine whether it contains certain strings using regular expressions, string matching algorithms, or the like. For example, the retrieved web page may be analyzed to determine whether it contains user interface strings as may be associated with the web-based application of web-based application server 100. Additionally or alternatively, elements of the retrieved web page not directly displayed to the user may be considered such as, for example, scripts referenced by the web page such as scripts using, for example, JavaScript or Adobe Flash or, additionally or alternatively, Cascading Style Sheet (CSS) style sheets as may be referenced by the retrieved web page. Additionally or alternatively, the web page may be analyzed to determine whether it contains elements related to style sheets as may associated with the web-based application of web-based application server 100 such as, for example, div class or div id values.

If it is determined the retrieved web page is associated with the web-based application of web-based application server 100 control flow proceeds to block S530 else control flow returns to block S510 for consideration of a next retrieved web page.

At block S530, the web page associated with the web-based application of web-based application server 100 is analyzed to extract one or more pieces of data. The data extracted may, for example, be data necessary or advantageous to the operation of the add-on application of add-on application server 130 or to the provision of one or more features of the add-on application of add-on application server 130 thereby.

For example, if the add-on application of add-on application server 130 provides insurance claim processing functionality, the data extracted may include, for example, patient name, treatment date, information about the treatment such, for example, as the details of any prescription or diagnosis such as, for example, drug name and dosage or an ICD10 code, and additionally or alternatively, other identifying information such as for example an identifying number such as insurance card number, social security number, or the like.

In another example, if the add-on application of add-on application server 130 is a customer relations management system, the data extracted may include, for example, customer name, order date, shipping address, or the like.

Extraction may utilize data extraction module 410. Data may be extracted from the retrieved web page such as by way of, for example, regular expression matching, searching for known substrings that may proceed or follow values of interest according to the known structure of a particular form interface page, matching metadata around known elements, locating specific DOM objects within the page, such as, for example, div class or div id, searching for names associated with prepopulated fields or one or more forms, or the like. Data extraction module 410 may comprise software such as may be employed in extraction such as, for example, a regular expression engine or a substring searching engine.

The extracted data may be normalized or otherwise put into a canonical or standardized form. For example, text data may be translated into a particular character encoding such as, for example, a Unicode variant such as, for example, UTF-8 or UCS-2, another encoding such as ASCII or EBCDIC, or the like. Data may also transformed in ways not limited to transfer between encodings. For example, capitalization of names may be standardized. As another example, addresses may be checked for conformance with addressing standards or validity. In some cases, data being normalized or standardized may be passed to a web service API for standardization or validation. For example, addresses may be validated or standardized using a web service API provided by a postal service. Additionally or alternatively, some or all of the extracted data may be transformed into a structured payload such as, for example, according to standards such as, for example, XML, JSON, HL7, or the like. Structured payloads may be more readily consumable or manipulable such as, for example, by external application programming interfaces (APIs), web services, or the like.

At block S540, the extracted data is transmitted to add-on server 130 such as, for example, by way of a request transmitted via network 140 by way of network controller 230. Data may be transmitted according to, for example, communications module 420. Data transmitted may include data about the retrieved web page, such as, for example, its associated URL or data extracted from therefrom at block S530. In this way, an application executing at application server 130 may have access to any data provided by or to an application running at server 100.

Conveniently, in this way, the add-on application of add-on application server 130 may be provided with access to information presented to the user via the web-based application interface pages without requiring user interaction to identify or transfer that data. For example, a user may avoid having to transfer data from a source to web browser windows or tabs corresponding to the add-on application of add-on application server 130 using "cut-and-paste" functionality.

Data provided to server 100 may be processed in any desirable way at server 130, allowing the functionality of the web-based application executing at server 100 to be extended. Results may be provided to client 120 and presented seamlessly at browser 320, as described below.

At block S550, data is received from add-on server 130, for example, by way of a response received over network 140 by way of network controller 230. Data may be received by, for example, communications module 420. Data received may include data indicating one or modifications that should be made to the previously retrieved web page, retrieved from server 100. For example, HTML code may be received for insertion by plug-in 340 into a previously retrieved web page, retrieved from server 100 to, for example, provide a link to or otherwise expose functionality provided by add-on server 130. Additionally or alternatively, data received may include values to be automatically inserted into one or more web forms of the previously retrieved web page. Additionally or alternatively, some or all of the received data may be structured. For example, the received data may comprise structured data formatted according to standards such as, for example, XML, JSON, HL7, or the like. Notably, in some embodiments, data received may include data previously received by add-on server 130 as extracted from one or more previously retrieved web pages associated with the web-based application of web-based application server 100. This may include previously stored data provided by web-based application server 100 and stored by add-on server 130 at database 150. Additionally or alternatively, the data retrieved may be data correlated with data transmitted to add-on server 130 at block S540. For example, data transmitted to add-on server 130 at block S540 may be used to perform a query against a database 150 in order to retrieve information employed in composing the response received at block S550.

At block S560, the previously retrieved web page, provided by server 100 by, for example, adding to, deleting from, or otherwise modifying the source code of the web page. For example, one or more HTML elements may be added or removed from the previously retrieved web page. Web pages may be modified according to Web Page compositing module 430.

In some embodiments, the previously retrieved web page is only rendered for display to the user of web browser 320 at block S560. As such, the first rendering of the web page will include any elements added or deleted. In alternate embodiments, the previously retrieved web pages is re-rendered for display to a user of web browser 320 at block S560 so that, for example, one or more elements such as, for example, text, textboxes, images, controls, such as, for example, buttons, frames, or the like may be added to or deleted from the a screen display of the previously displayed web page associated with web browser 320.

Figure 6A:
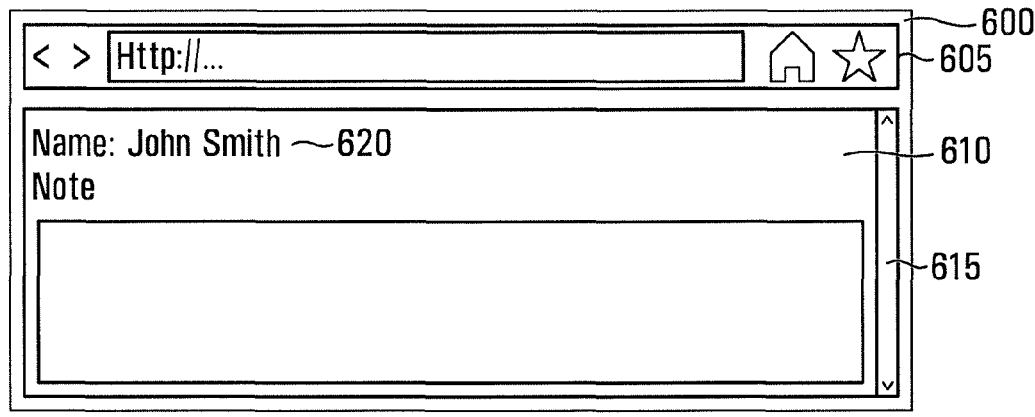
FIG. 6A illustrates a mock-up of an example screen display, exemplary of an embodiment, before modification.
Figure 6B:
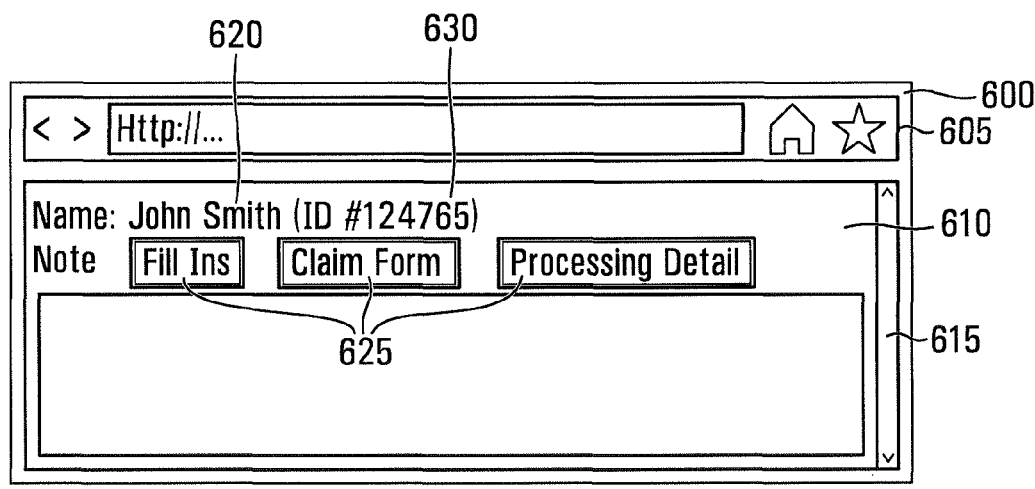
FIG. 6B illustrates a mock-up of the example screen display of FIG. 6A after modification.

FIGS. 6A and 6B illustrate mock-ups of an example screen display of web browser 320, exemplary of an embodiment. FIGS. 6A and 6B display an example user interface web page of an example electronic medical records web-based application of web-based application server 100 before and after (respectively) modification of the web page by way of web-based application extension plug-in 340 for an example medical insurance add-on application. In an embodiment, plug-in 340 will be customized with knowledge of the format of web-pages and data provided by an application of interest hosted by server 100.

As illustrated in both FIGS. 6A and 6B, web browser window 600 is a screen display of web browser 320. Web browser window 600 has various elements including an address bar 605, a web page display 610, and a scrollbar 615.

Web page display 610 is a display in human-readable form of a web page accessed using web browser 320. Address bar 605 displays the URL of the current web page displayed in web page display 610. As illustrated, address bar 605 includes various controls such as may permit a user to navigate forward or backwards between various previously accessed web pages, navigate to a home page, mark the current homepage as a favorite, and the like. Scrollbar 615 is operable to scroll web page display 610 so as to permit review of the contents of a web page that cannot be displayed all together at once as a screen display.

As illustrated, web page display 610 corresponds to a user interface page of an exemplary electronic medical records system permitting a user to make notes regarding a patient. Notably, web page display 610 includes the name of an example patient, John Smith, to whose record the notes input corresponds.

As noted, FIG. 6B, illustrates the web page displayed of FIG. 6A after modification of the web page by way of web-based application extension plug-in 340.

As illustrated, new elements have been added to the web page of FIG. 6B as reflected in web page display 610, namely an identification number 630 and control buttons 625.

Identification number 630 is an identifier such as may be used, for example, to identify patient John Smith to the add-on application of add-on application server 130.

Control buttons 625 are buttons added to web page display 610 so as to permit access to functionality of the add-on application of add-on application server 130. As illustrated, control buttons 625 includes a buttons labelled "Fill Ins.", "Claim Form", and "Procedure Detail" such as may be used to access functionality such as filling the notes box with insurance information, triggering display of a new web page with an insurance claim form corresponding to patient John Smith, or raising a pop-up window such that a procedure code may be entered for insurance purposes, respectively.

Conveniently, in this way, the web-based application and the add-on application may be made to appear to an end-user as a seamless, integrated experience to an end-user. A seamless, integrated experience may reduce the need to switch between tabs or windows and may enhance the productivity of users.

The screen displays of FIG. 6A and FIG. 6B are in no way limiting and are only by way of example. The subject-matter of the present application may be equally applied to other web pages or to otherwise modify web pages such as by, for example, removing information, adding information, changing formatting, or the like.

In some embodiments, web-based application extension plug-in 340 may only extract information from some web pages associated with the web-based application of web-based application server 100 and may not modify them. Additionally or alternatively, web-based application extension plug-in 340 may not extract information from some web pages associated with the with the web-based application of web-based application server 100 but may modify them such as, for example, according to information previously transmitted to add-on application server 130.

In some embodiments, the application of add-on application server 130 may be an add-on from the perspective of using the web-based application of web-based application server 100 in the context of their interaction with that that application, but may also be accessible directly (i.e. not as an add-on) by the same or other users who may access the application of add-on application server 130 directly. Conveniently, data collected by way of web-based application plug-in 340 may be available when the application of add-on application server 130 is accessed directly such as by way of, for example, retrieval of information previously saved to database 150 by add-on application server 130.

In some embodiments, web-based application extension plug-in 340 may provide single sign-on functionality for applications of add-on application server 130. Web-based application extension plug-in 340 may monitor to detect when a user is logged in to the web-based application of web-based application server 100. For example, web-based application extension plug-in 340 may detect that the log-in page of the web-based application of web-based application server 100 has been successfully used to log-in. Alternatively, web-based application extension plug-in 340 may detect a log-in cookie or the like.

Conveniently, in this way, security of both applications may be enforced where a user may only be required to log-in once to permit use of both applications instead of requiring authentication with the applications of web-based application server 100 and add-on application server 130 separately.

Likewise, any security settings of browser application 320, or associated with access to web-based application server 100 may be inherited by extension plug-in 340. In this way, extension plug-in 340 may access data to which access would otherwise be restricted. For example, encrypted data may be accessible to extension plug-in 340, once decrypted by browser 320. As well, insofar as the user of application at server 100 has been authenticated or authorized, any data received at device 120 may accessible to plug-in 340 and passed to server 130. This may be particularly convenient, if client 120 is on an intranet, and server 100 and client 120 are behind a firewall, not otherwise accessible to server 130 (e.g. as server 130 is otherwise interconnected over network 140, which may be the public internet).

In some embodiments, data uploaded by web-based application extension plug-in 340 may further include an identifier corresponding to the identity of the user of the web-based application of web-based application server 100. For example, the data uploaded may include the username, an identifying token, or the like. Web-based application server 100 may then tag the information with that identity and may restrict access to that information to only that user. For example, data stored in database 150 may include a field identifying the user of the web-based application of web-based application server 100 by way of whose access to pages of the web-based application the data was retrieved.

Conveniently, in this way, controls on access to information in the web-based application of web-based application server 100 may also be enforced by add-on application server 130. Additionally or alternatively, data uploaded by web-based application extension plug-in 340 may further include an identifier corresponding to a group of which the user of the web-based application of web-based application server 100. For example, members of a group may have identical access to data by way of web-based application server 100. Add-on application server 130 may then restrict access to each item of data uploaded thereto to members of the group associated with data so that controls on access to information in the web-based based application of web-based application server 100 may be honored by add-on application server 130 while also providing the convenience of making particular data available in the add-on application server 130 to all members of an associated group even if a particular user has not visited the corresponding page of the web-based application of web-based application server 100 from which that data was extracted.

In some embodiments web-based application extension plug-in 340 may create an audit trail of information extraction and uploaded to add-on application server 130. For example, web-based application extension plug-in 340 may transmit audit records to web-based application server 100. Additionally or alternative, web-based application extension plug-in 340 may interact with web-based application server 100 by way of one or more user interface pages of a web-based application to create an audit trail such as, for example, by adding notes to entries in the web-based application identifying that information was extracted therefrom.

Optionally, such entries may include information about the extraction such as a summary of the information extracted, the date/time of extraction, the user doing the extraction, or the like.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A computer-implemented method of extending web pages of a first web-based application with user interface elements of a second web-based application at a client, said first web-based application hosted by a first web server and said second web-based application hosted by a second web server, each of said first and second servers in communication with said client, the method comprising:
    receiving, at said client from said first server, a web page;
    detecting said web page as a web page comprising a user interface element of said first web-based application, said interface element of said first web-based application providing access to a service provided by said first web-based application;
    in response to said detecting:
        analyzing, at said client, extracting data from said web page by said client;
        sending, from said client to said second server, said extracted data;
        receiving, at said client from said second server, an indication of one or more modifications to make said web page so as to display a user interface element of said second web-based application to insert to said web page, said interface element of said second web-based application providing access to a service provided by said second web-based application;
        modifying, by said client, said web page according to said indication to generate a modified web page, said modified web page including said user interface element of said first web-based application and said user interface element of said second web-based application; and
        displaying, at said client, a screen display corresponding to said modified web page, thereby allowing a user of said client device to access services of both said first web-based application and said second web-based application through said modified web page.

2. The method of claim 1, wherein said detecting and said steps in response to said detecting are performed at said client according to a web browser plug-in.

3. The method of claim 1, wherein said indication comprises data sent by said client, said data extracted from one or more web pages of said first web-based application.

4. The method of claim 1, wherein said extracting data comprises evaluating one or more regular expressions.

5. The method of claim 1, wherein said extracting data comprises searching said web page for one or more strings.

6. The method of claim 1, wherein said indication comprises HTML.

7. The method of claim 1, wherein said extracted data is stored by said second server in a database.

8. The method of claim 1, wherein said web page is provided to said user after authenticating said user.

9. The method of claim 1, wherein said web page is encrypted.

10. The method of claim 1, wherein said web page is provided to said user over an intranet, and wherein said extracted data is provided by way of the public internet to said second web server.

11. A client computer system, said system comprising:
    at least one processor;
    a network adapter in communication with said at least one processor;
    a display; and,
    memory in communication with said at least one processor, said memory storing software adapting said client computer system to extend web pages of a first web-based application with user interface elements of a second web-based application, said first web-based application hosted by a first web server and said second web-based application hosted by a second web server, each of said first and second servers in communication with said client computer system, wherein said software when executed by said at least one processor, causes said client computer system to:
    receive, at said client from said first server, a web page;
    detect said web page as a web page comprising a user interface element of said first web-based application, said interface element of said first web-based application providing access to a service provided by said first web-based application;
    in response to said detecting:
        extract data from said web page by said client;
        send, from said client to said second server, said extracted data;
        receive, at said client from said second server, an indication of a user interface element of said second web-based application to insert to said web page, said interface element of said second web-based application providing access to a service provided by said second web-based application;
        modify, by said client, said web page according to said indication to generate a modified web page, said modified web page including said user interface element of said first web-based application and said user interface element of said second web-based application; and
        display, at said client, a screen display corresponding to said modified web page, thereby allowing a user of said client device to access services of both said first web-based application and said second web-based application through said modified web page.

12. The system of claim 11, wherein said software comprises a web browser plug-in.

13. The system of claim 11, wherein said indication comprises data sent by said client, said data extracted from one or more web pages of said web-based first application.

14. The system of claim 11, wherein said data extraction comprises evaluating one or more regular expressions.

15. The system of claim 11, wherein said extraction of data comprises searching said web page for one or more strings.

16. The system of claim 11, wherein said indication comprises HTML.

17. The system of claim 11, wherein said extracted data is stored by said second server in a database.

18. The system of claim 11, wherein said web page is sent to said client computer system in an encrypted format.

19. The system of claim 11, wherein said web page is provided to said client computer system over an intranet, and wherein said extracted data is provided by way of the public internet to said second web server.

20. A computer-readable storage medium storing instructions that when executed by a computer cause said computer to perform operations comprising the method of claim 1.

21. The computer-readable storage medium of claim 20 wherein said instructions embody a web browser plug-in.

* * * * *